(12) United States Patent
Binesse et al.

(10) Patent No.: US 9,323,952 B2
(45) Date of Patent: Apr. 26, 2016

(54) CRYPTOGRAPHIC EQUIPMENT IMPLEMENTING RED/BLACK COMMUNICATION MODES

(75) Inventors: Dominique Binesse, Cholet (FR); Patrick Duputz, Gennevilliers (FR); Gael Mace, Cholet (FR); Romaric Maillard, Cholet (FR)

(73) Assignee: THALES, Neuilly sur Seine (FR)

( * ) Notice: Subject to any disclaimer, the term of this patent is extended or adjusted under 35 U.S.C. 154(b) by 63 days.

(21) Appl. No.: 14/111,096

(22) PCT Filed: Apr. 11, 2012

(86) PCT No.: PCT/EP2012/056571
§ 371 (c)(1),
(2), (4) Date: Oct. 11, 2013

(87) PCT Pub. No.: WO2012/140077
PCT Pub. Date: Oct. 18, 2012

(65) Prior Publication Data
US 2014/0032931 A1    Jan. 30, 2014

(30) Foreign Application Priority Data
Apr. 11, 2011    (FR) ..................................... 11 01105

(51) Int. Cl.
| G06F 21/64 | (2013.01) |
| G09C 1/10  | (2006.01) |
| H04L 9/08  | (2006.01) |

(52) U.S. Cl.
CPC ........ *G06F 21/64* (2013.01); *G09C 1/10* (2013.01); *H04L 9/0822* (2013.01); *H04L 2209/12* (2013.01)

(58) Field of Classification Search
CPC ........ G06F 21/64; G09C 1/10; H04L 2209/12
See application file for complete search history.

(56) References Cited

U.S. PATENT DOCUMENTS

| 5,995,628 A * | 11/1999 | Kitaj et al. ..................... 713/164 |
| 2002/0014962 A1 * | 2/2002 | Miglioli et al. ............... 340/571 |

(Continued)

FOREIGN PATENT DOCUMENTS

FR    2901939    12/2007

OTHER PUBLICATIONS

Department of the Army, "Tactics, Techniques, and Procedures (TTPs) for the Joint Network Node-Network (JNN-N)," *Field Manual Interim*, No. FMI 6-02.60 (2006).

(Continued)

*Primary Examiner* — Izunna Okeke
*Assistant Examiner* — Cheng-Feng Huang
(74) *Attorney, Agent, or Firm* — Knobbe, Martens, Olson & Bear, LLP

(57) ABSTRACT

The described technology relates to cryptographic equipment which includes an input interface, a red module, a cryptographic module, a black module, and an output interface. The cryptographic module includes a cryptographic unit, which interacts with the red module and with the black module, and a management device, which interacts with the input interface and with either the red module or the black module, but not with both simultaneously. The cryptographic unit and the management device are physically and logically separate from one another and independent, and have an identical protection mechanism capable of protecting the integrity of the management device so as to detect any attempt at tampering.

9 Claims, 2 Drawing Sheets

(56) References Cited

U.S. PATENT DOCUMENTS

Figure 1:
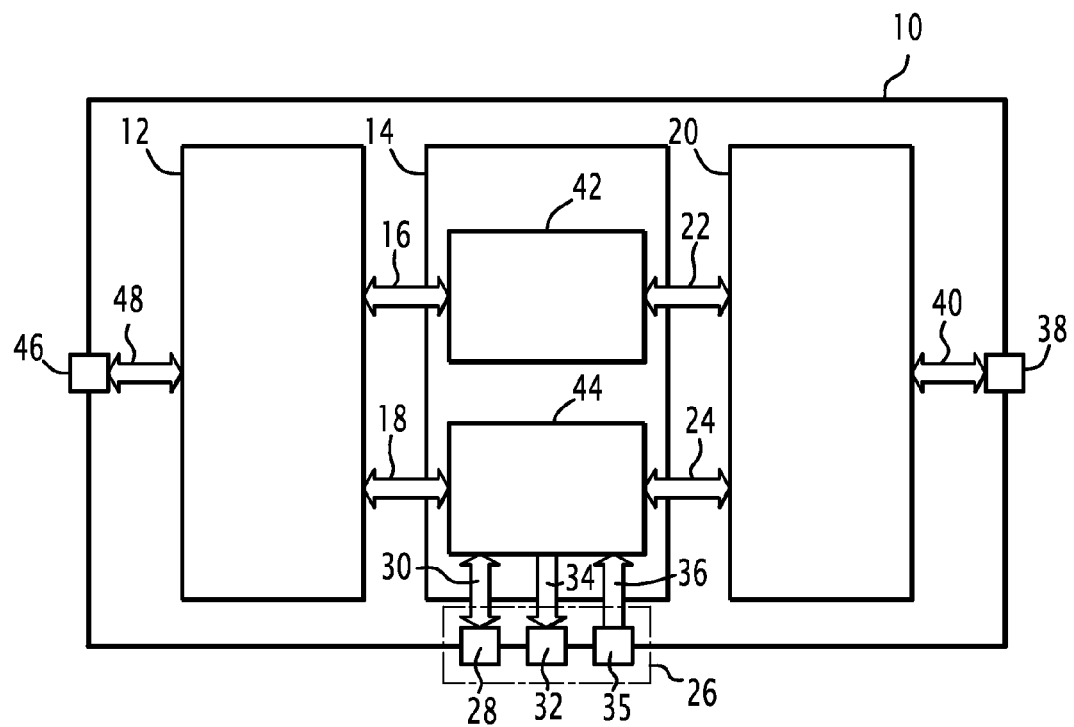

2002/0028038 A1* 3/2002 Parker .......................... 385/24
2005/0216765 A1* 9/2005 Petkus et al. ................. 713/201

OTHER PUBLICATIONS

Search Report issued in Int'l Application No. PCT/EP2012/056571 (2012).

* cited by examiner

CRYPTOGRAPHIC EQUIPMENT IMPLEMENTING RED/BLACK COMMUNICATION MODES

CROSS REFERENCE TO RELATED APPLICATIONS

This application is a U.S. nationalization under 35 U.S.C. §371 of International Application No. PCT/EP2012/056571, filed Apr. 11, 2012, which claims priority to French Patent Application No. 1101105, filed Apr. 11, 2011. The disclosures set forth in the referenced applications are incorporated herein by reference in their entireties.

The present invention relates to cryptographic equipment comprising:
- an input interface, allowing to interact with the cryptographic equipment and share sensitive or non-sensitive information sequentially,
- a red module, intended to process sensitive information,
- a cryptographic module, connected to the red module by a first upstream internal link and adapted to apply cryptographic functions,
- a black module, connected to the cryptographic module by a first downstream internal link and adapted to process non-sensitive information, and
- an output interface, connected to the black module by a first interface link and intended to manage information sharing from the cryptographic equipment.

It falls within the field of information systems security.

It relates to the design of security equipment, and more particularly, the design of cryptographic equipment, such as tactical radio sets, processing sensitive information.

Cryptographic pieces of equipment have an architecture generally comprising a red host domain and a black host domain that are physically separated by a cryptographic domain. The red host domain processes the sensitive information in clear. The black host domain processes non-sensitive information, the disclosure of which does not compromise the security of the information system. This non-sensitive information is either information in clear, which is intrinsically not sensitive, or encrypted information, which is intrinsically sensitive but made non-sensitive by encryption.

The cryptographic domain includes a cryptographic unit equipped with cryptographic functions necessary for protection/deprotection of sensitive information across the red and black host domains. The cryptographic equipment also comprises two external interfaces: a first interface or user interface, connected to the red host domain, and a second interface or external interface, connected to the black host domain.

The cryptographic equipment comprises an "encryption" mode capable of processing sensitive information. In the "encryption" mode:
  The sensitive information, entering on the user interface, is encrypted by the cryptographic domain and leaves secured on the external interface of the black domain.
  Information entering on the external interface is decrypted by the cryptographic domain and leaves, in clear state, on the user interface of the red domain.

In addition to the "encryption" mode, some cryptographic pieces of equipment have a "clear" mode that makes it possible to process non-sensitive information.

Thus, the "encryption" mode makes it possible to secure the sensitive information by using the cryptographic functions of the cryptographic domain, the "clear" mode not using the cryptographic functions to send information.

The known implementations are based on the establishment within the cryptographic pieces of equipment of a clear transmission channel between the red host domain and the black host domain making it possible not to apply cryptographic protection and allowing information to be shared between the two domains in clear. More specifically, the clear transmission channel directly connects the red host domain and the black host domain by passing through the cryptographic unit of the cryptographic domain without going through the cryptographic functions of the cryptographic unit.

However, the implementation of the "clear" mode within cryptographic pieces of equipment creates a major security risk for the confidentiality of the user's sensitive information.

In fact, the untimely activation of the "clear" mode, for example by an unintentional action by the user or a failure of the cryptographic equipment, may cause the disclosure of the user's sensitive information, such as a clear transmission of sensitive information and/or unavailability of sensitive applications belonging to the user, corresponding to an interruption in the security services offered by the equipment.

Furthermore, this type of equipment is used in the aeronautic and technical fields, which require a significant availability of the "clear" mode, which generally corresponds to a backup function of the cryptographic equipment.

The aim of the invention is therefore to propose a new architecture for cryptographic equipment, making it possible to implement the "clear" mode under all circumstances, without undermining the overall security of the equipment and without affecting the availability of the equipment and the associated applications.

To that end, the invention relates to cryptographic equipment of the aforementioned type, characterized in that the cryptographic module includes:
  a cryptographic unit, which interacts with the red module through the first upstream internal link, and with the black module through the first downstream internal link, and adapted to process the sensitive information using cryptographic functions, and
  a management device, which interacts with the input interface through at least one second interface link and with either the red module through a second upstream internal link, or the black module through a second downstream internal link, but not with both simultaneously, and adapted to orient the sensitive information between the input interface and the second upstream internal link, or the non-sensitive information between the input interface and the second downstream internal link, without the non-sensitive information passing through the red module,
and in that the cryptographic unit and the management device are physically and logically separate from one another and independent, and have identical protection means, capable of protecting the integrity of the management device so as to detect any tampering attempt.

According to other alternative embodiments, the cryptographic equipment comprises one or more of the following features, considered alone or according to any technically possible combinations:
  the cryptographic unit and the management device have separate physical resources;
  the management device comprises:
    an orienting device simultaneously connected to the second upstream internal link, the second downstream internal link, and at least one second interface link, the orienting device being intended to link the input interface either to the red module or to the black module, but not both simultaneously, and verification means of the orienting device connected simultaneously to:
- the orienting device, so as to control the link to be made, and
- the input interface, so as on the one hand to receive a selection instruction for the link to be made according to a selected operating mode, and on the other hand to inform the user of the current operating mode;

the input interface comprises:
- an external physical interface connected to the orienting device and intended to send the sensitive or non-sensitive information to the cryptographic equipment and to receive the sensitive or non-sensitive information from the cryptographic equipment,
- an indicator connected to the verification means of the orienting device and intended to indicate the current operating mode, and
- selecting means connected to the verification means of the orienting device and intended to provide the selection instruction for the selected operating mode;

the cryptographic equipment comprises an additional external physical interface connected to the red module and intended to send and receive sensitive information, without passing through the management device;

the red module includes an element from the group consisting of: an audio encoding device, an audio retrieval device, an echo canceling device, an audio gain verification device, an error detection and correction device, an analog-digital converter, a digital-analog converter, a data packet classification device, a data routing device, and a data filtering device;

the black module includes an element from the group consisting of: an audio encoding device, an audio retrieval device, an analog-digital converter, a modulator/demodulator, a transmission error detection and correction device, a digital-analog converter, an electric, radiofrequency or optical emitter/receiver, an electrical, radiofrequency or optical power amplifier, a data routing device, a data filtering device, and a data packet classification device;

the output interface is an element from the group consisting of: an audio interface, a radiofrequency interface, a wired electrical interface, and an optical interface;

the cryptographic equipment is an element from the group consisting of: a radio set, a network encryptor, a feeder encryptor, an encrypting audio receiver, an encrypting terminal;

the management device includes at least one of the elements from the group consisting of: an electromagnetic component, a discrete electronic component, a programmable logic circuit, and an integrated circuit.

Figure 2:
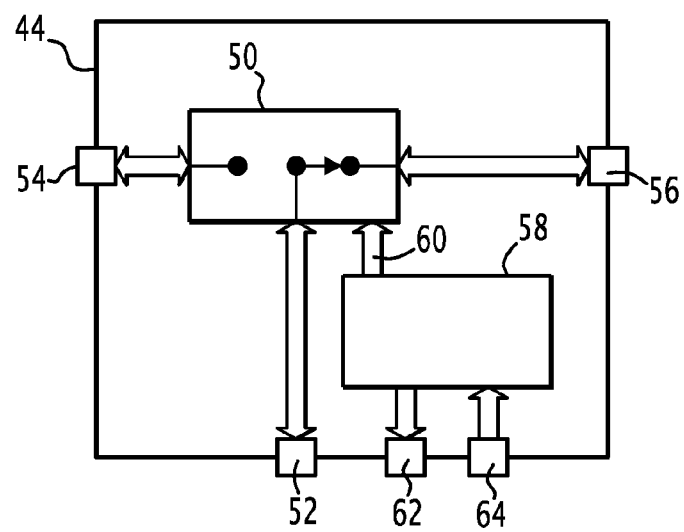
Figure 3:
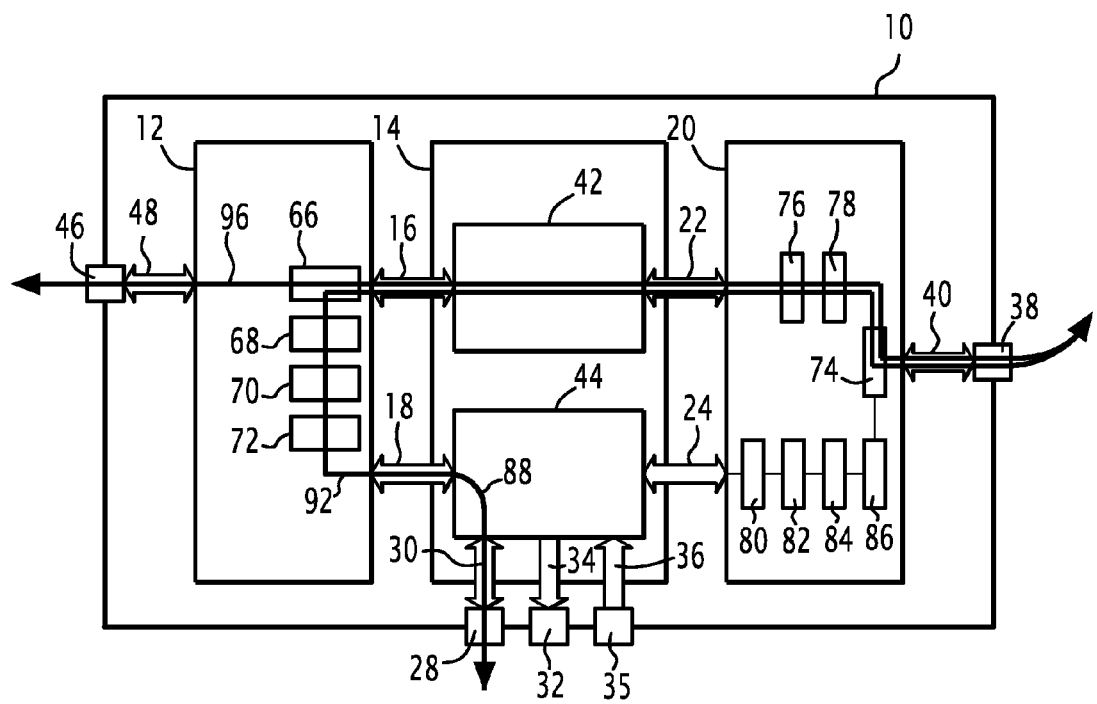
Figure 4:
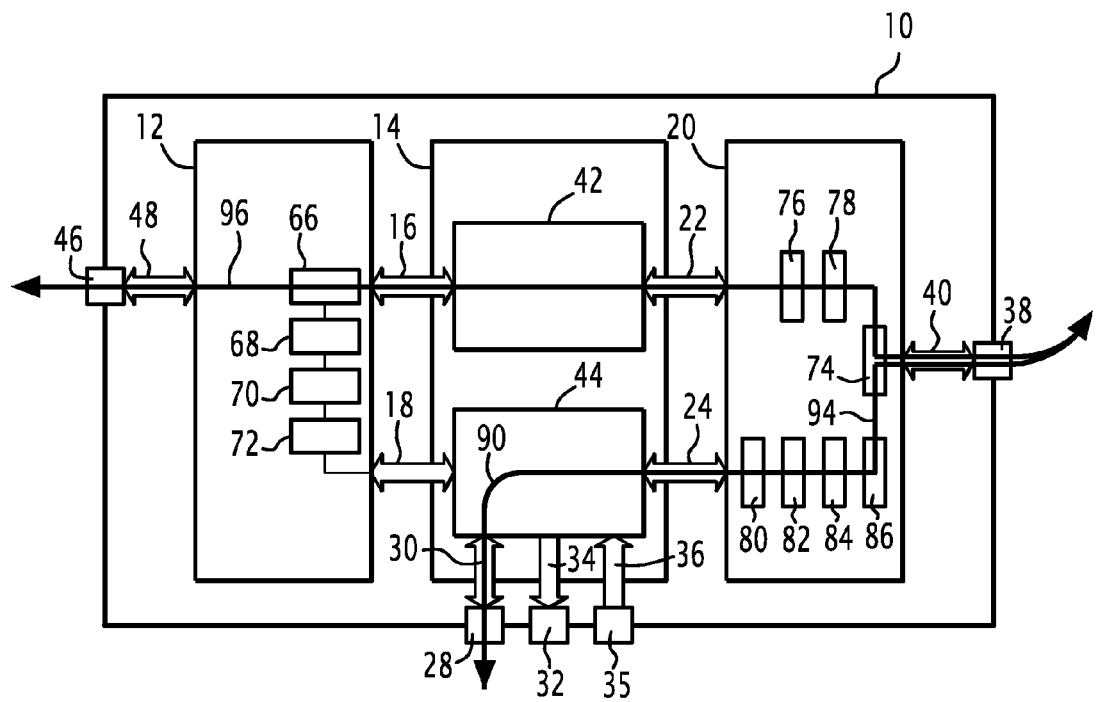

The invention will be better understood upon reading the following description, provided solely as an example and done in reference to the appended drawings, in which:

FIG. 1 is a diagrammatic illustration of cryptographic equipment according to the invention, FIG. 2 is a diagrammatic illustration of a management device in clear mode according to the invention, FIG. 3 is a diagrammatic illustration of a tactical radio set according to a first embodiment of the invention, and FIG. 4 is a diagrammatic illustration of a tactical radio set according to a second embodiment of the invention.

The cryptographic equipment 10 according to the invention, illustrated in FIG. 1, in the considered example constitutes a tactical radio set capable of sending and receiving in two operating modes, i.e., an "encryption" mode and a "clear" mode, depending on whether the information being sent is protected by confidentiality. This equipment is characterized by a security architecture divided into three modules. A red module 12, also called red host domain, is connected to the cryptographic module 14, also called cryptographic domain, through two upstream links 16, 18. A black module 20, also called black host domain, is connected to the cryptographic module 14 by 2 downstream internal links 22, 24.

The red module 12 is capable of processing sensitive information in clear.

The black module 20 is capable of processing only non-sensitive information, i.e., information that presents no risk of compromising security if disclosed. This information is either clear information, which is intrinsically non-sensitive, or encrypted information, which is intrinsically sensitive but made non-sensitive by encryption.

The cryptographic module 14 is capable of desensitizing or sensitizing, respectively, information going from the red module to the black module, or from the black module to the red module, respectively. To that end, it uses algorithms and cryptographic keys to encrypt and decrypt the information.

The cryptographic equipment 10 comprises a bidirectional input interface 26 connected to the cryptographic module 14.

For example, as illustrated in FIG. 1, the input interface 26 includes an external physical interface 28 connected to the cryptographic module 14 by an interface link 30. The external interface 28 is intended to send information to the cryptographic equipment 10 and to receive information from the cryptographic equipment 10.

The interface 26 also comprises an audio or visual indicator 32, for example such as a multicolor lighted indicator, intended to indicate the current operating mode and connected to the cryptographic module 14 through an interface link 34. It lastly comprises selecting means 35 capable of choosing the desired operating mode, i.e., either the "clear" mode or the "encryption" mode. The latter is connected to the cryptographic module 14 by means of an interface link 36.

Furthermore, the cryptographic equipment 10 comprises a bidirectional output interface 38 connected to the black module 20 through an interface link 40. This interface is intended to share non-sensitive information between the cryptographic equipment 10 and the outside environment, for example a network.

The cryptographic module 14 includes two devices that are physically and logically independent and separate from one another:
- a cryptographic unit 42 intended to process the sensitive information using cryptographic functions, and
- a clear mode management device 44, capable of orienting the information in both directions between the input interface 26 and one of the two black or red modules 12, 20 depending on the selected operating mode.

More specifically, the cryptographic unit 42 is capable of interacting with the red module 12 through the upstream internal link 16 on the one hand, and with the black module 20 through the downstream internal link 22 on the other hand.

Likewise, the clear mode management device 44 is capable of interacting with the red module 12 through the upstream internal link 18 on the one hand, and with the black module 20 through the downstream internal link 24 and the other hand.

Furthermore, the clear mode management device 44 is capable of interacting with the input interface 26 through at least one interface link, for example through interface links 30, 34 and 36.

The unit 42 and the device 44 have unique physical resources, separate from one another. For example, each has a specific power supply dedicated solely to it, as well as a dedicated processing circuit.

The cryptographic equipment 10 meets the standards and security recommendations.

In particular, the security recommendations in force regarding the architecture of cryptographic equipment recommend partitioning the cryptographic functions of the cryptographic module 14 so as to obtain an independent cryptographic unit 42 as well as separation between the red module 12 and the black module 20.

In order to obtain an accreditation that allows the cryptographic equipment 10 to be deployed in a client infrastructure, a security evaluation is conducted to verify compliance of the cryptographic equipment 10 with the aforementioned security recommendations.

Thus, to meet the requirements of the recommendations, the cryptographic module 14 implements physical protection mechanisms shared by the unit 42 and the device 44, characterized by a given protection level, making it possible to protect the integrity of the cryptographic unit 42 and the management device 44.

For example, the module 14 includes a housing made up of a chassis and a cover. A holographic label is used to seal the chassis and the cover. Thus, any attempt to access the internal components of the module 14 is detected.

The red 12 and black 20 modules also have a given level of physical protection, that level being lower than the level of protection of the cryptographic module 14.

According to one preferred embodiment, the cryptographic equipment 10 includes an additional external physical interface 46 connected to the red module 12 through an interface link 48. This interface 46 conveys sensitive information between the cryptographic equipment 10 and the outside environment, for example such as a network.

FIG. 2 illustrates a diagram of the clear mode management device 44 according to one embodiment of the invention.

The clear mode management device 44 includes an orienting device 50, for example a bidirectional switch with one input and two outputs. The switch is capable of linking the external physical interface 28 via a port 52, either to the red module 12 through an upstream internal port 54, or to the black module 20 through a downstream internal port 56, exclusively.

The clear mode management device 44 further comprises verification means 58 for the orienting means 50, connected to the device 50 through a control link 60 and intended to control the device 50.

The verification means 58 are also connected to the indicator 32 through an interface port 62 on the one hand, and to the selector 35 through an interface port 64 on the other hand.

The red module 12, also called red domain, contains all of the functions and interfaces that process the unencrypted data, i.e., the clear data. The functions of the red module 12 process the unencrypted data before that data is transferred to the cryptographic functions of the cryptographic module 14.

More specifically, using the example of a radio set, as illustrated in FIG. 3, the red module 12 includes a filtering/routing device 66 connected to the interface link 48 on the one hand, and the upstream internal links 16 on the other hand. The filtering/routing device 66 is also indirectly connected to the upstream internal link 18 through an adapter 68, an audio encoding device 70 and an analog-digital converter 72, successively serially connected.

The black module 20, also called black domain, contains all of the functions and interfaces that process the encrypted data when it comes from the cryptographic unit 42, and clear data when it comes from the clear mode management device 44 without passing through the red module 12. The functions of the black module 20 process the data before it is transmitted to the output interface 38.

More specifically, the black module 20 comprises two independent information processing chains between the downstream internal link 22 and a first internal connection to a radiofrequency adapter 74 on the one hand, and the downstream internal link 24 and a second internal connection of the radiofrequency adapter 74 on the other hand. Furthermore, the radiofrequency adapter 74 is also linked through a third connection to the interface connection 40.

The first information processing chain, intended to process sensitive information, comprises a digital-analog converter 76 connected at its input to the downstream internal link 22, and at its output to the input of a modulator/demodulator 78. The latter is also connected at its output to the first internal connection of the radiofrequency adapter 74.

The second information processing chain, intended to process non-sensitive information, comprises an analog-digital converter 80, identical to the analog-digital converter 72, an audio encoding device 82, identical to the audio encoding device 70, a digital-analog converter 84, and a modulator-demodulator 86 successively serially connected. Furthermore, the analog-digital converter 80 is connected at its input to the downstream internal link 24, the modulator-demodulator 86 being connected at its output to the second internal connection of the radiofrequency adapter 74.

The operation of the cryptographic equipment 10, as shown in FIG. 1, will now be described.

The cryptographic equipment 10 comprises two exclusive operating modes allowing two-way information sharing between the input interface 26 and the output interface 38: a first mode, or "encryption" mode, allowing secure processing of the sensitive data, and a second mode, or "clear" mode, allowing processing of the non-sensitive data.

FIGS. 3 and 4 illustrate the operation of one example of cryptographic equipment 10, for example a tactical radio set, according to the selected operating mode. In this example, the radio set comprises an audio receiver connected to the external physical interface 28, thus corresponding to an audio port of the radio set.

When the user selects a "clear" or "encryption" operating mode using the selection means 35, a selection instruction is sent over the link 36 to the verification means 58 via the interface port 64, as illustrated in FIG. 2. After reception of the selection instruction, the verification means 58 send a control signal over the control link 60 to the orienting device 50, so as to form the link corresponding to the selected operating mode.

More specifically, depending on the received control signal, the orienting device 50 makes an internal connection 88 or 90 so as to link the interface port 52 either to the internal port 54 or the internal port 56.

In the first case, the internal connection 88 produces an end-to-end connection 92 shown in FIG. 3. In the second case, the internal connection 90 produces an end-to-end connection 94 shown in FIG. 4.

Once the connection is established, the verification means 58 send an information signal to the indicator 32 via the interface port 62 in order to power the indicator 32 based on the connection produced, and therefore the current operating mode.

Thus, to choose the "encryption" mode, illustrated in FIG. 3, the user selects the corresponding position on the selecting means 35, which then send a selection instruction over the interface link 36 to the clear mode management device 44.

Upon receiving this instruction, the clear mode management device 44 orders the internal connection 88 between the external physical interface 28 and the red module 12, thus connecting the internal link 18 to the interface link 30. Once the connection 88 is established, a specific information signal is sent by the clear mode management device 44 over the interface link 34 to the indicator 32, so as to activate its power supply in correspondence with the "encryption" mode. As an example, using a multicolor lighted indicator, the red color lights up.

All of the sensitive data sent over the external physical interface 28 is then reoriented exclusively toward the red module 12.

For example, in the case of a secure voice transmission communication, the voice is then converted in the form of a data stream using the analog-digital converter 72. This stream is then vocoded by the sound encoding device 70. The data then passes through the adaptor 68, which converts the corresponding signal before the data is sent to the filtering/routing device 66. The latter then transfers audio data to the cryptographic unit 42 through the upstream internal link 16.

The digitized and vocoded audio stream is sent to the cryptographic module 14 for encryption. It is then encrypted by the cryptographic functions of the cryptographic unit 42, then sent over the link 22 to the black module 20, or black domain.

The data received by the black module 20 is converted into analog form using the digital-analog converter 76 of the first information processing chain, then transferred to the associated modulator/demodulator 78, which modulates the corresponding signal. The data is then sent to the radiofrequency adaptor 74, which filters and amplifies the signal before the data is sent over the link 40 toward the output interface 38, for example corresponding to an antenna interface.

Conversely, the audio data passing over the output interface 38 toward the external physical interface 28 follows a path identical to the upstream internal link 16. Next, the audio data is filtered, then oriented by the filtering/routing device 66 from the red module 12 toward the upstream internal link 18 to the clear mode management device 44 after passing through the adaptor 68, the audio encoding device 70 and the analog-digital converter 72 of the module 12, respectively.

Thus, in "encryption" mode, the bidirectional end-to-end connection 92 is established between the external physical interface 28 and the output interface 38, so as to offer a secure voice transmission communication service.

Furthermore, the sensitive data sent over the additional external physical interface 46 through the link 48 is sent directly and only to the filtering/routing device 66 of the red module 12, then sent over the upstream internal link 16 to the cryptographic unit 42.

Next, the sensitive data follows a path identical to the audio data. In fact, after encryption, the cryptographic unit 42 sends encrypted data through the downstream internal link 22 toward the black module 20.

Then, after performing, within the module 20, conversion operations using the digital-analog converter 76 and modulation operations done by the modulator/demodulator 78, the signal in the form of a secure wave, associated with the data, is sent to the radiofrequency adapter 74. Next, the signal is sent over the interface link 40 toward the output interface 38.

In the opposite direction, the radiofrequency signal, containing the secure data received from the output interface 38, is sent toward the downstream internal link 22, owing to the use of a specific filter for the secured wave form within the radiofrequency adapter 74, after having been converted by the demodulator 78 and the additional-analog converter 76.

Next, at the end of the cryptographic processing, the data is transmitted over the upstream internal link 16 toward the filtering/routing device 66 of the red module 12, which will make it possible to orient the data toward the additional external physical interface 46.

Then, a two-way connection 96, different from the connection 92, is produced between the additional external physical interface 46 and the output interface 38, so as to offer a secure data communication service.

Consequently, all of the sensitive information must pass through the cryptographic unit 42 and therefore receive cryptographic processing, for example encryption operations when information passes through the module 12 toward the module 20, and decryption in the opposite direction, thus ensuring securing of the information.

Thus, in "encryption" mode, the radio set offers two communication services available in parallel: a secure data communication service, and a secure voice transmission communication service.

The second, or "clear", operating mode of the cryptographic equipment 10 is illustrated in FIG. 4.

According to the same principle as previously described, once the "clear" mode is selected by the user on the selecting means 35, a selection instruction is sent to the clear mode management device 44.

Upon receipt of that instruction, the clear mode management device 44 establishes a connection 90, different from the connection 88, between the external physical interface 28 and the black module 20, thereby linking the internal link 24 to the interface link 30. After establishing the connection 90, the clear mode management device 44 sends a specific information signal to the indicator 32, for example toward the multicolor lighted indicator, thereby activating lighting of the indicator with the color corresponding to the "clear" mode, for example green.

Then, all of the non-sensitive information sent over the external physical interface 28 is oriented only toward the black module 20, without passing through the red module 12, then sent directly to the output interface 38.

The same is true in the opposite direction, from the output interface 38 toward the external physical interface 28.

More specifically, using the example of the radio set comprising an audio receiver connected to the external physical interface 28, the analog voice data resulting from the audio receiver is sent over the external physical interface 28 toward the management device 44.

The information is then oriented by the management device 44 toward the black module 20, which adapts the information received in clear so as to allow it to be sent to the outside environment via the output interface 38.

More specifically, within the black module 20, the audio data sent over the link 24 is converted within the second information processing chain in the form of a digital signal using the analog-digital converter 80. Then, the audio encoding device 82 compresses the signal, which is next reconverted into an analog format in the form of a clear wave by the digital-analog converter 84. Next, a modulator/demodulator 86 performs the modulation operation, then the radiofrequency adapter 74 adapts the signal into a radiofrequency signal that can be sent to the output interface 38.

Conversely, the radiofrequency signal containing unencrypted data received from the antenna interface is oriented toward the link 24 by the black module 20. This orientation is done owing to the use of a specific filter within the radiofrequency adapter 74 making it possible to distinguish between a clear wave form signal and a secure wave form signal.

This signal then undergoes, within the second information processing chain, the different processing operations for demodulation by the modulator/demodulator 86, analog-digital conversion by the digital-analog converter 84, decompression by the audio encoding device 82, and digital-analog conversion by the analog-digital converter 80 so as to be sent to the clear mode management device 44.

Thus, in "clear" mode, a specific bidirectional connection 94, different from the bidirectional connection 92, is established between the external physical interface 28 and the output interface 38, making it possible to offer a clear voice transmission communication service.

Furthermore, the "clear" mode is capable of additionally offering a secure data communication service owing to the establishment of the bidirectional connection 96 between the additional external physical interface 46 and the output interface 38.

Thus, the path of the non-sensitive information in "clear" mode is different from the path of the sensitive information in "encryption" mode, the non-sensitive information not passing through the cryptographic unit 42.

Consequently, in "clear" mode, the radio set offers two communication services available in parallel: a secure data communication service, and a clear voice transmission communication service.

Then, the cryptographic unit 42 and the clear mode management device 44 being physically separate and independent, in the event the cryptographic unit 42 fails, the clear voice transmission communication service remains available, since only the management device 44 and the black module 20 are necessary to establish clear audio communication.

Furthermore, if the "clear" mode is activated unintentionally, the cryptographic equipment 10 has the advantage of avoiding the transmission in clear of sensitive data received on the additional external physical interface 46 through the cryptographic unit 42 and not interrupting the security services offered by the cryptographic equipment 10.

Thus, in light of the functional and physical independence of the management device 44 with respect to the cryptographic unit 42, the activation of the "clear" mode at the management device 44 does not disrupt the performance or the implementation of the cryptographic functions of the cryptographic equipment 10.

Additionally, the architecture and particular operation of the cryptographic equipment 10 make it possible to eliminate the need to implement a clear transmission channel at the cryptographic unit 42.

Consequently, when the "clear" mode is activated, the operations typically performed at the cryptographic unit 42, for example such as the secure erasure of sensitive information or saving the performance context of the cryptographic functions, are no longer necessary.

Thus, the transition into the "clear" mode of the cryptographic equipment 10 according to the invention is practically instantaneous.

Other applications may be considered for the cryptographic equipment, for example use as a network encryptor, feeder encryptor, encrypting audio receiver, or encrypting terminal (encrypting telephone).

Of course, other embodiments may be considered based on the applications of the cryptographic equipment.

The red module may for example include one of the following elements: an audio encoding device, an audio retrieval device, an echo canceling device, an audio gain verification device, an error detection and correction device, an analog-digital converter, a digital-analog converter, a data packet classification device, a data routing device, and a data filtering device.

The black module may include one of the following elements: an audio encoding device, an audio retrieval device, an analog-digital converter, a modulator/demodulator, a transmission error detection and correction device, a digital-analog converter, an electric, radiofrequency or optical transceiver, an electric, radiofrequency or optical power amplifier, a data routing device, a data filtering device, and a data packet classification device.

The output interface may be an audio interface, for example a loudspeaker, a radiofrequency interface, for example an antenna, a wired electrical interface, for example a USB or Ethernet interface, or an optical interface, for example of the Ethernet type.

Lastly, the management device may include at least one of the following elements: an electromechanical component, a discrete electronic component, a programmable logic circuit, and an integrated circuit.

The invention claimed is:

1. Cryptographic equipment, comprising:
   a first input interface configured to interact with the cryptographic equipment and share sensitive or non-sensitive information sequentially;
   a red host domain configured to process sensitive information;
   a cryptographic domain connected to the red host domain by a first upstream internal link and configured to apply cryptographic functions;
   a black host domain connected to the cryptographic domain by a first downstream internal link and configured to process non-sensitive information;
   an output interface connected to the black host domain by a first interface link and intended to manage information sharing from the cryptographic equipment; and
   a second input interface connected to the red host domain,
   wherein the first input interface is configured to form a first secured connection with the output interface,
   wherein the second input interface is configured to form a second secured connection with the output interface,
   wherein the first and second secured connections are different and are arranged in parallel,
   wherein the cryptographic domain includes:
      a cryptographic unit comprising a cryptographic processing circuit which interacts with the red host domain through the first upstream internal link, and with the black host domain through the first downstream internal link, and wherein the cryptographic processing circuit is configured to process the sensitive information using the cryptographic functions, and
      a management device comprising a management processor configured to interact with the first input interface through at least one second interface link and with either the red host domain through a second upstream internal link, or the black host domain through a second downstream internal link, but not with both simultaneously,
   wherein the management processor is further configured to orient the sensitive information between the first input interface and the second upstream internal link, or the non-sensitive information between the first input interface and the second downstream internal link, without the non-sensitive information passing through the red host domain, wherein the cryptographic unit and the management device are physically and logically separate from one another and independent, wherein the cryptographic unit and the management device include identical protective housings configured to: i) protect the integrity of the management device and ii) detect any tampering attempt, and wherein the management device further comprises:
- a bidirectional switch simultaneously connected to the second upstream internal link, the second downstream internal link, and at least one second interface link, the bidirectional switch being configured to link the first input interface either to the red host domain or to the black host domain, but not both simultaneously, and
- a bidirectional switch controller connected simultaneously to:
  - the bidirectional switch, and
  - the first input interface, wherein the bidirectional switch controller is configured to: i) receive a selection instruction for controlling the bidirectional switch according to a selected operating mode, and ii) inform the user of the current operating mode.

2. The cryptographic equipment according to claim 1, wherein the cryptographic unit and the management device have separate physical resources.

3. The cryptographic equipment according to claim 1, wherein the first input interface comprises:
- an external physical interface connected to the bidirectional switch and configured to send the sensitive or non-sensitive information to the cryptographic equipment and to receive the sensitive or non-sensitive information from the cryptographic equipment,
- an indicator connected to the bidirectional switch controller and configured to indicate the current operating mode, and
- a selector connected to the bidirectional switch controller and configured to provide the selection instruction for the selected operating mode.

4. The cryptographic equipment according to claim 1, wherein the second input interface is configured to send and receive sensitive information, without passing through the management device.

5. The cryptographic equipment according to claim 1, wherein the red host domain includes an element from the group consisting of: an audio encoding device, an audio retrieval device, an echo canceling device, an audio gain verification device, an error detection and correction device, an analog-digital converter, a digital-analog converter, a data packet classification device, a data routing device, and a data filtering device.

6. The cryptographic equipment according to claim 1, wherein the black host domain includes an element from the group consisting of: an audio encoding device, an audio retrieval device, an analog-digital converter, a modulator/demodulator, a transmission error detection and correction device, a digital-analog converter, an electric, radiofrequency or optical emitter/receiver, an electrical, radiofrequency or optical power amplifier, a data routing device, a data filtering device, and a data packet classification device.

7. The cryptographic equipment according to claim 1, wherein the output interface is an element from the group consisting of: an audio interface, a radiofrequency interface, a wired electrical interface, and an optical interface.

8. The cryptographic equipment according to claim 1, wherein the cryptographic equipment is an element from the group consisting of: a radio set, a network encryptor, a feeder encryptor, an encrypting audio receiver, an encrypting terminal.

9. The cryptographic equipment according to claim 1, wherein the management device includes at least one of the elements from the group consisting of: an electromagnetic component, a discrete electronic component, a programmable logic circuit, and an integrated circuit.

\* \* \* \* \*